United States Patent [19]
Fuller et al.

[11] Patent Number: 5,286,203
[45] Date of Patent: Feb. 15, 1994

[54] SIMULATING HORIZONTAL STABILIZER TRIMMING IN AN AIRCRAFT

[75] Inventors: John J. Fuller, Binghamton; Charles J. Bratt, Johnson City; Wayne Blackwell, Chenango Forks; Paul E. Mueller, Greene, all of N.Y.

[73] Assignee: AAI Microflite Simulation International, Binghamton, N.Y.

[21] Appl. No.: 957,137

[22] Filed: Oct. 7, 1992

[51] Int. Cl.⁵ .............................................. G09B 9/00
[52] U.S. Cl. .......................................... 434/45; 244/178
[58] Field of Search .................. 434/29, 30, 32, 35, 434/43–46, 47, 35, 38, 51, 55, 58, 65–67; 244/75 R, 178, 220; 364/424.06, 578

[56] References Cited

U.S. PATENT DOCUMENTS

| | | |
|---|---|---|
| 4,504,233 | 3/1985 | Galus et al. ............................ 434/45 |
| 4,599,070 | 7/1985 | Hladky et al. ......................... 434/45 |
| 4,710,128 | 12/1987 | Wachsmuth et al. ............. 434/59 X |
| 4,751,662 | 6/1988 | Crosbie ............................... 434/55 X |
| 4,820,162 | 4/1989 | Ross ..................................... 434/45 |
| 5,009,598 | 4/1991 | Bennington ...................... 434/45 X |
| 5,158,459 | 10/1992 | Edelberg ................................ 434/45 |

Primary Examiner—Richard J. Apley
Assistant Examiner—Glenn Richman
Attorney, Agent, or Firm—Salzman & Levy

[57] ABSTRACT

The present invention features a simulator apparatus and method for realistically simulating actual forces at the horizontal stabilizer trim controls of an aircraft. The invention features a closed-loop, microprocessor-based programmable system with reduced mechanical, electromechanical, and/or hydraulic components. The microprocessor computes the required reaction forces using a softward model of the horizontal stabilizer trim system.

4 Claims, 4 Drawing Sheets

SIMULATING HORIZONTAL STABILIZER TRIMMING IN AN AIRCRAFT

FIELD OF THE INVENTION

The present invention pertains to the simulation of real forces for a horizontal stabilizer trim control of an aircraft and, more particularly, to a new computerized simulation system for horizontal stabilizer trimming controls that eliminates much complex mechanical linkage and allows for the system to be easily and quickly upgraded or modified without costly, complicated redesign.

1. Background of the Invention

The use of simulators for the training and/or certifying of pilots on aircraft is well known. Aircraft or flight simulators are particularly beneficial in providing pilots a chance to experience mock emergency situations without risk to human life or equipment. An aircraft simulator must provide authenticity with respect to the cockpit environment, or its worth as a training device is diminished. It is particularly important that the controls used by a pilot provide the correct feel during both routine and emergency maneuver simulations.

In an aircraft, horizontal stabilizers provide longitudinal trim by varying their angles of attack. In a typical aircraft (such as a Boeing 727 or 737), the horizontal stabilizers are free to move through a 17-degree range of travel relative to a horizontal plane. This movement is accomplished utilizing a jackscrew and a ball nut. The jackscrew is turned by one of three types of actuators:

a) the main electrical actuator operated by the pilot;
b) an autopilot actuator; or
c) a manual backup system actuated by the pilot.

It is the simulation of the manual backup system which is the subject of the present invention.

In the usual manual backup system for achieving the horizontal stabilizer trim of an aircraft, a pair of control wheels is mounted in the aircraft's cockpit proximate the control stand. These control wheels are coupled via a mechanical linkage to a forward trim mechanism which is usually located in the nose of the aircraft. The forward trim mechanism drives a cable drum. A cable which is windable upon the drum runs the entire length of the aircraft to a similar winding drum in the rear. The rear cable drum, coupled via a gear box to the jackscrew, enables the manual, pilot-actuated movement of the horizontal stabilizers.

Movement of the jackscrew, caused by either the main or the autopilot electrical actuators, is transmitted via the cable system to the aircraft's cockpit, since the entire system is mechanically coupled. This movement is translated into the rotation of the trim control wheels in the simulator cockpit. The trim wheels may be rotated only a limited number of turns in either direction, because the jackscrew is free to travel only through a limited rnage of motion.

In a typical 727 aircraft, the number of turns from stop to stop is 162. When the system is actuated by one of the electrical actuators, the maximum speed of rotation of the aircraft's trim control wheels is 342 rpm. A maximum force of 135 foot-pounds may develop at the trim control wheels. All of these factors must be accounted for in designing the simulation system.

A number of elements influence the forces felt by the pilot when he or she manually turns the trim control wheels. First, aerodynamic forces act upon the horizontal stabilizer surfaces. These forces vary significantly, depending upon the airspeed of the aircraft and the particular maneuver being executed. Inertia and friction are also present in the mechanical system. Since the system contains a significant length of cable, cable stretch is also a factor in the design.

Sophisticated mechanisms have evolved to replicate an actual cockpit control of an aircraft, as well as to simulate the real forces experienced by a pilot training on an aircraft simulator. These mechanisms comprise complex mechanical, electromechanical or hydraulic components.

Prior art has always simulated a single or a particular aircraft model or type. These simulators usually become obsolete as changes are made to the actual aircraft.

It is not uncommon to find that, to accommodate even small changes to the aircraft, a simulator redesign is required. Introduction by an aircraft manufacturer of a new model of an aircraft type always requires a complete redesign. The cost of such redesign is relatively high; and the redesigned system is often initially unreliable until the usual, minor technical problems can be worked out of the redesigned simulation controls.

The present invention seeks to provide a new simulation system that eliminates many of the aforementioned drawbacks. This invention has eliminated many of the complex mechanisms of the simulation system. In addition, the invention introduces a new concept in simulation design, that of universality. The simulation system can be modified easily to accommodate different aircraft types and models. The simulated controls can also be modified easily to adapt to individual pilot preferences.

2. Discussion of Related Art

In U.S. Pat. No. 4,599,070, issued to Hladky et al, an apparatus and method for simulating an aircraft control system is illustrated. Disclosed are an apparatus and method for simulating a movable control of an aircraft control wheel or rudder pedals. The force and movement parameters of the control can vary, according to the simulated operation of the system. This system utilizes simple mechanical elements (such as springs) to simulate reactive forces experienced by the pilot.

In U.S. Pat. No. 4,504,233, issued to Galus et al, there is illustrated a sophisticated means for providing realistic loading on an aircraft's control stick. This system comprises a hydraulic actuator under computer control to more accurately simulate reactive forces felt by the simulator pilot.

SUMMARY OF THE INVENTION

In accordance with the present invention, there is provided a simulator apparatus and method for simulating actual forces at the horizontal stabilizer trim controls of an aircraft. The invention features a closed-loop, microprocessor-based programmable system with reduced mechanical, electromechanical and/or hydraulic components. The programming provides the system with universality. This programming can be modified easily to accommodate desing changes to the aircraft. It can also be adapted to completely new models or aircraft types. The reprogramming is far less costly than the prior necessity of redesigning the simulator mechanisms. Thus, both the initial and maintenance costs for the simulator are minimized, and the reliability of the system greatly improved.

An object of the present invention is to provide an improved simulation of aircraft's horizontal stabilizer trim operation by providing a more realistic simulation of the forces that a pilot would actually encounter and experience during flight.

Another object of the invention is to provide a more reliable aircraft simulator.

A further object of this invention is to reduce the cost of the construction and maintenance of an aircraft simulator.

Still another object of the present invention is to provide a universal system for simulating horizontal stabilizer trim control, one that is easily modifiable and one that accommodates aircraft design changes, including the introduction of completely new models and aircraft types.

BRIEF DESCRIPTION OF THE DRAWINGS

A complete understanding of the present invention may be obtained with reference to the accompanying drawings, when considered in conjunction with the subsequent, detailed description, in which.

DESCRIPTION OF THE PREFERRED EMBODIMENT

Figure 1:
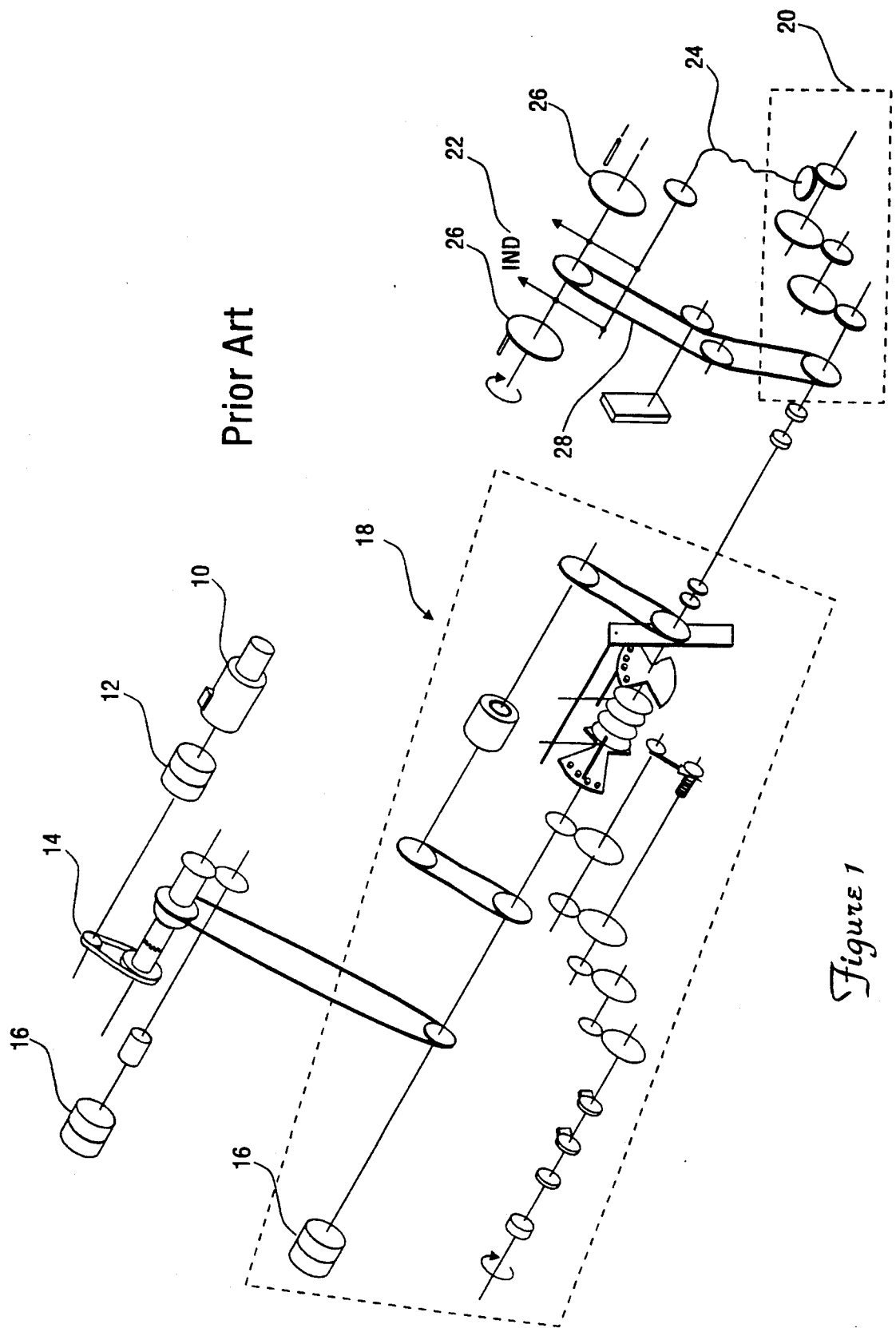
FIG. 1 illustrates a schematic diagram of a prior art simulator system for controlling the horizontal stabilizer trim in an aircraft.

Referring to FIG. 1, there is shown a prior art, open-loop electromechanical/hydraulic simulator system for simulating forces at the horizontal stabilizer trim control of an aircraft. A hydraulic motor 10 is connected to the remaining components of the system through a clutch 12. A torque transducer 14 monitors and makes possible subsequent adjustment for an instantaneous force experienced by the system.

Electrically actuated brakes 16 are used to load and/or stop the motion of the system. A loading unit, shown generally at reference numeral 18, comprises a series of gears, shafts, chains and sprockets operating cooperatively to apply a resistive counterforce to the system. An indicator drive unit 20 also comprises a plurality of gears, shafts, sprockets and chains operating cooperatively to move a horizontal stabilizer position indicator 22 via a flexible shaft 24.

A pilot (not shown) uses a pair of control wheels 26 to control and adjust the horizontal stabilizer trim of the simulated aircraft. The control wheels 26 are coupled to the simulator system via a sprocketed chain 28.

Figure 2:
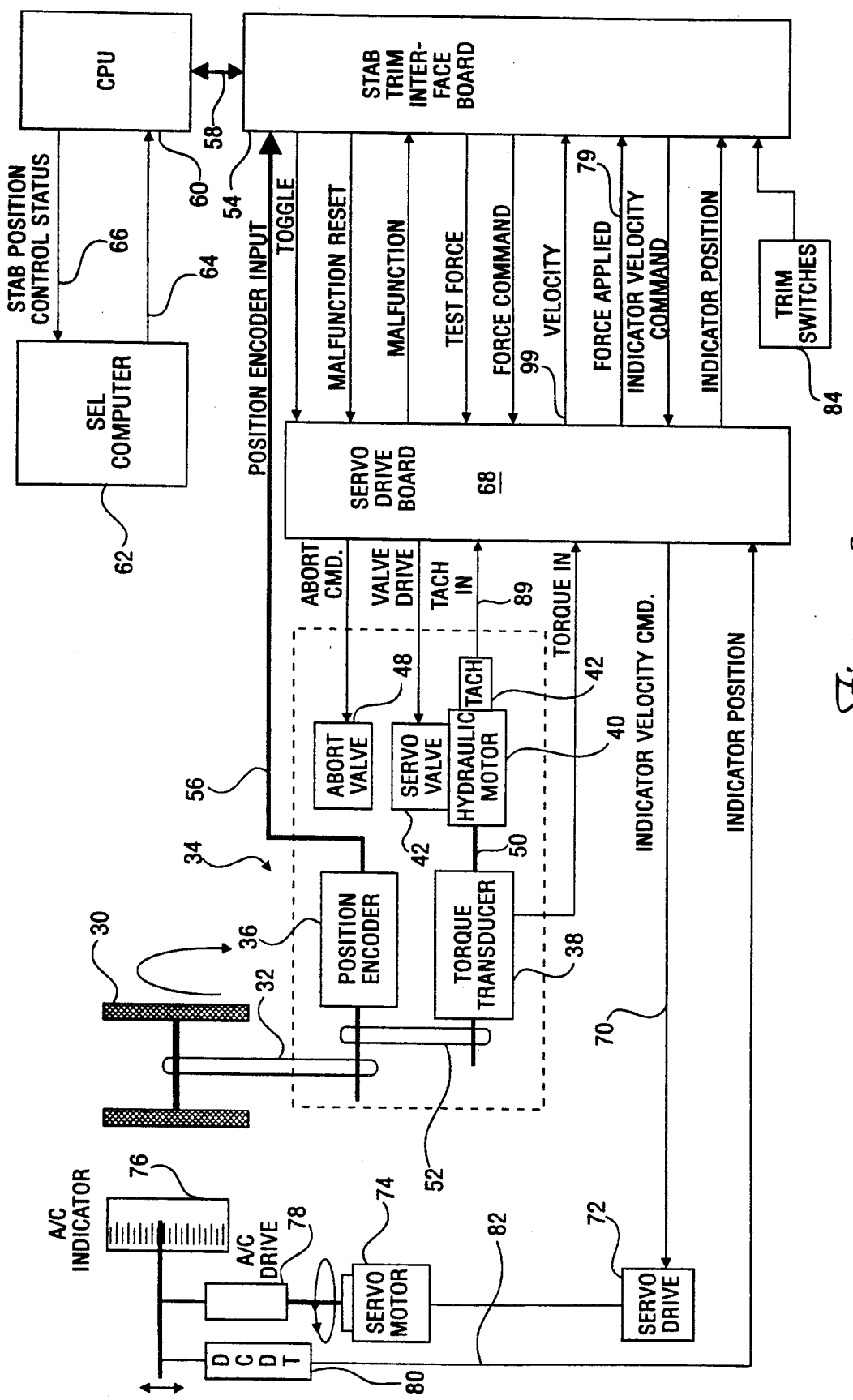
FIG. 2 depicts a block diagram of the simulator system of the present invention used in simulating the horizontal stabilizer trim control of an aircraft.
Figure 3:
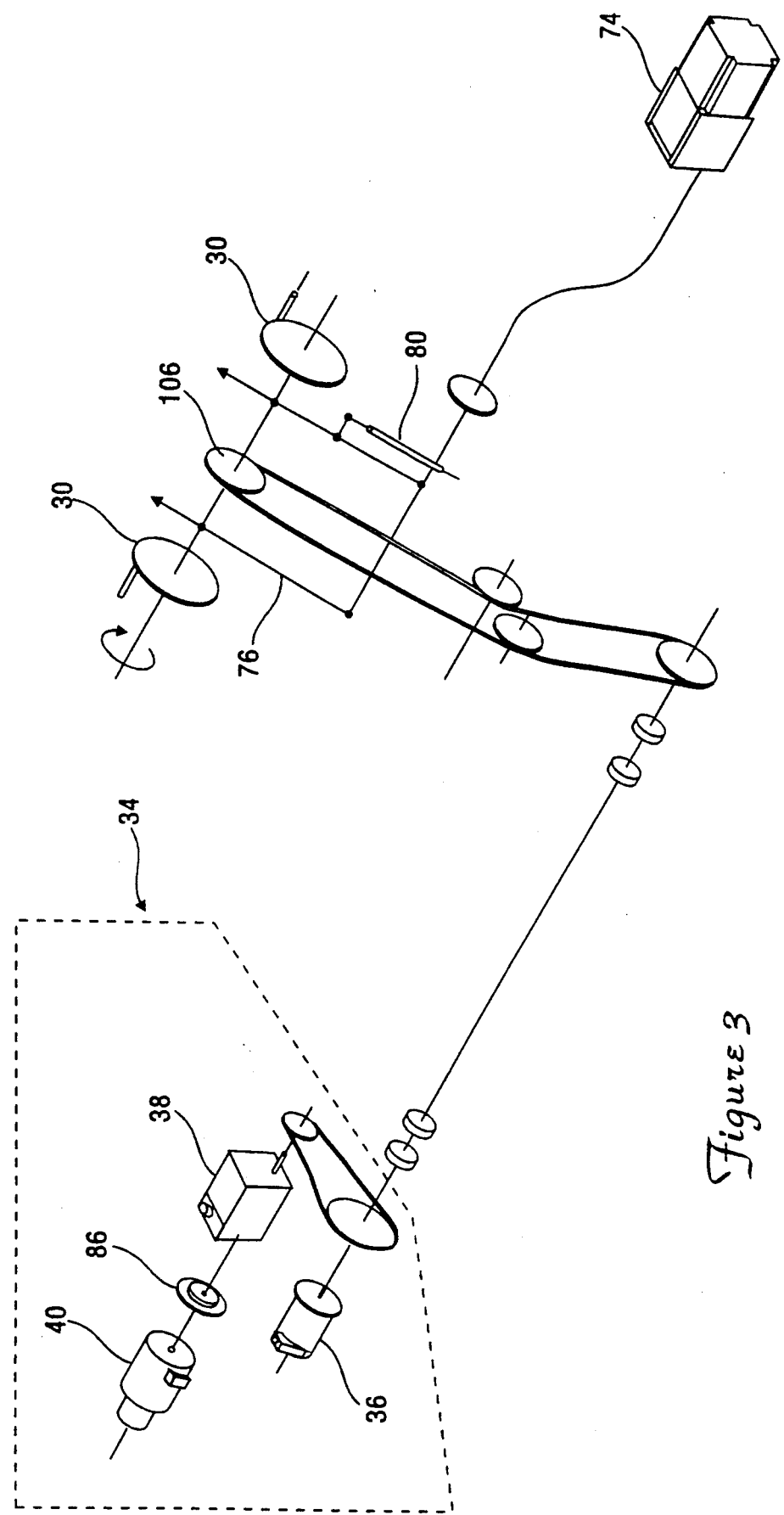
FIG. 3 shows a schematic diagram of the drive unit for the simulator system of the invention, as depicted in FIG. 2.

Referring to FIGS. 2 and 3, a block diagram of the simulator system of this invention is shown. The simulator comprises a closed-loop system for producing realistic forces at the horizontal stabilizer trim control of an aircraft. A pair of pilot-actuated trim control wheels 30 is mounted on the cockpit control stand (not shown). The trim control wheels 30 are coupled via a mechanical linkage 32 (described in greater detail hereinafter) to a drive unit shown generally at reference numeral 34. Drive unit 34 includes a 12-bit absolute-position optical encoder 36, such as that of BEI Motion System Company, Model No. M25D-X-HSS4096-N-X-177-X-S-C14-X-5.Encoder 36 is coupled to a torque transducer 38 via a mechanical linkage 52. Torque transducer 38 has an output voltage of ±1.0 v. at an input torque level of 150 inch-pounds. The torque transducer 38 in this embodiment is Teledyne Engineering Service Model No. C12732-3. Connected to the torque transducer 38 via a shaft 50 is a hydraulic motor 40 with an integrally attached tachometer 42. The hydraulic fluid intake of motor 40 is 1 cubic inch/revolution, the no-load speed 1550 rpm, adjusted to stall at a load of 313 inch-pounds. Tachometer 42 provides an output voltage of 45 V DC at 1000 rpm. The motor 40 in the preferred embodiments is a Moog, Inc. Model No. 84-890.

A servo valve 46 controls the flow of hydraulic fluid to motor 40. Servo valve 46 has a capacity of 5 gpm at a supply pressure of 2000 psi.

An abort valve 48 is provided to overide the servo valve 46. A stabilizer trim servo drive board 68 is connected to the abort valve 48, servo valve 46, tachometer 42, and torque transducer 38. Board 68 is also connected to a stabilizer trim interface board 54. Board 54 is a general purpose interface board having discrete or digital output (DO) ports, thirty-two discrete or digital input (DI) ports, seven 16-bit, ±10v. analog input (AI) ports, three 16-bit ±10v. analog output (AO) ports, and a fail-safe toggle circuit.

Trim switches 84 are attached to board 54. Board 54 is attached via a two-way data bus to CPU board 60. CPU board 60 is a standard Motorola Model No. 135 CPU board. Board 60 is connected via data interfaces 64 and 66 to a SEL computer 62.

An additional servo drive board 72 is connected to a servo motor 74. Servo motor 74 is connected via a drive unit 78 to a horizontal stabilizer position indicator 76. A linear position transducer 80 is connected to both indicator 76 and board 68.

Figure 4:
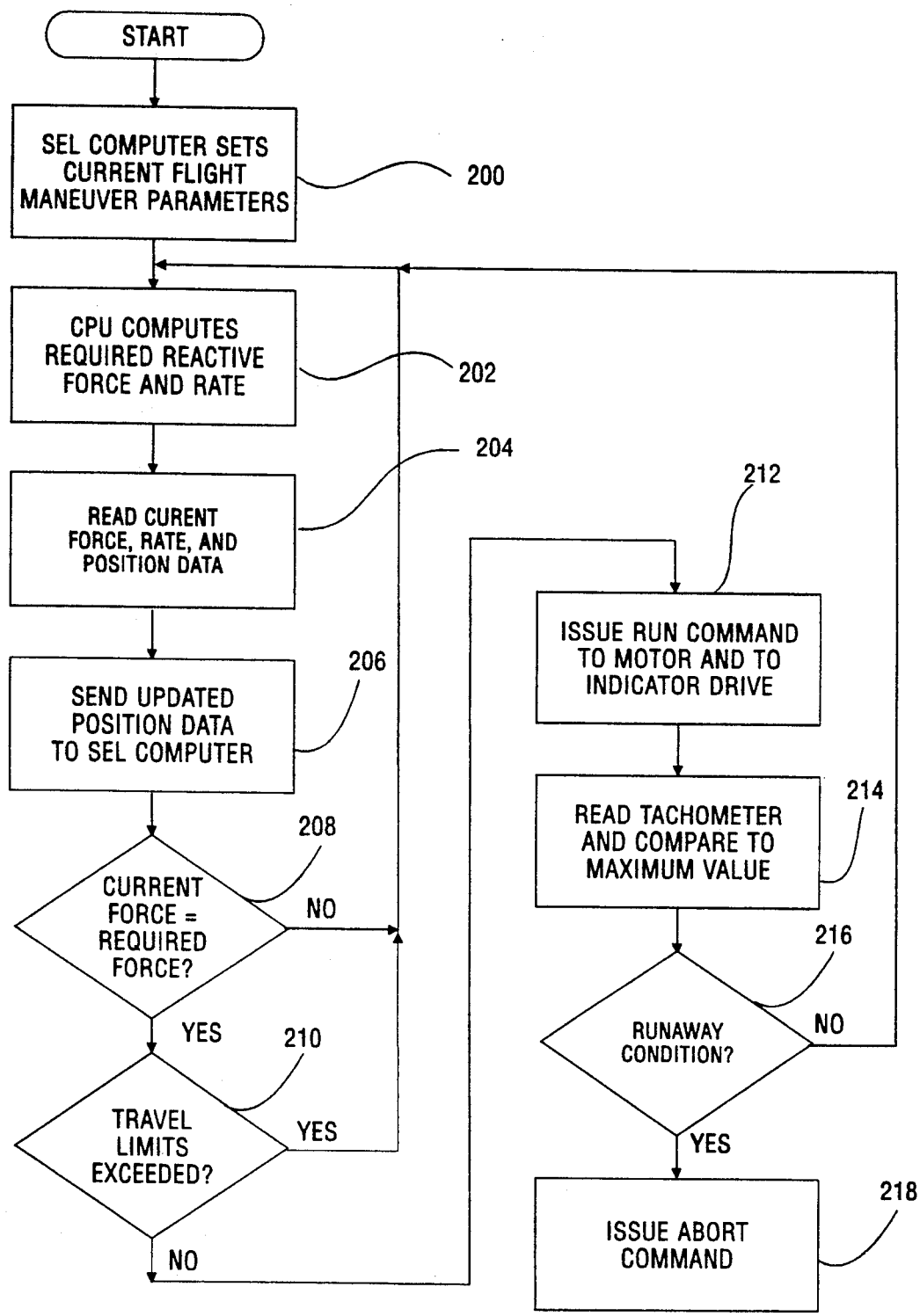
FIG. 4 illustrates a flow chart comprising the processing steps of the inventive simulator system, as shown in FIG. 2.

Referring to FIG. 4, there is shown a flow chart for the operation of the horizontal stabilizer trim simulation system of this invention. The aircraft simulator's SEL computer 62 (FIG. 2) provides information about a current maneuver to CPU board 60 via data bus 64, step 200.

The CPU board 60 computes the required reaction force and rate, step 202, using a software model of the horizontal stabilizer trim system. Factors included in the software model include coulombic friction, cable stretch, inertia, position limits, manual and autopilot motor velocities, the control to surface gearing, aerodynamic forces, lost motion and system malfunctions. All of these factors can be changed to reflect changes in the aircraft design as new models are introduced. In this fashion, the invention for the first time provides a simulation system that is universal in character.

The force being applied, the rate and the position of the system are then read, step 204, from torque transducer 38, tachometer 42 and position encoder 36. The output signal from torque transducer 38 is applied to servo drive board 68 via line 69 (FIG. 2).

The board 68 applies the TORQUE IN signal to a forward friction calculation circuit (not shown) and sends this signal to stabilizer trim interface board 54 via the FORCE APPLIED signal line 79. The output signal from tachometer 38 is also applied to board 68 via TACH IN line 89. This signal is also applied to the forward friction calculation circuit within board 68; it is also sent to board 54 via the VELOCITY signal line 99. Position encoder 36 applies 12-bit absolute-position data to board 54 via an optical position encoder input data bus. Position resolution is accurate to 0.08789 degrees of the rotation of trim control wheels 30. Current applied force, rate, and absolute-position information are received by board 54 via digital input (DI) ports; this information is then passed to CPU 60 via the data bus 58.

The updated horizontal stabilizer control position information is returned to the SEL computer 62, step 206, from CPU 60 via stab position control status line 66.

The required reaction force and rate are compared to the current force and rate in CPU 60, step 208. If the required reactive force and rate are equal to the current applied force and rate, no change to the system response is required and control is transferred to step 202. If a system response change is required (i.e., if the required reactive force and rate are not equal to the current force and rate), control is transferred to step 210. At that point, the CPU 60 (using data from position encoder 36, supplied via board 54 and data bus 58) determines whether the system is at either travel limit.

If the system is at a travel limit, step 210, control is transferred to step 202. Otherwise, control is transferred to step 212, at which point a FORCE COMMAND is issued by CPU 60 to board 54 via data bus 58. Board 54, in turn, passes the FORCE COMMAND received from CPU 60 to board 68 via a FORCE COMMAND line. Board 68 interprets the FORCE COMMAND received from board 54 and issues a VALVE DRIVE COMMAND to servo valve 42. Valve 42 supplies hydraulic fluid to hydraulic motor 46; rotation in the appropriate direction then commences. In addition, board 68 issues a command via an INDICATOR VELOCITY COMMAND line to servo drive 72 to run motor 40 and, consequently, to move horizontal stabilizer position indicator 78.

Tachometer 42 is then read, step 214; this information is passed to step 216, which determines whether a preprogrammed maximum rotation rate of motor 40 has been exceeded. Tachometer 42 supplies a DC signal via TACH IN line 89 to an analog input (AI) port of board 68.

If a maximum rate has been exceeded, an ABORT COMMAND is issued by board 68 via an ABORT COMMAND line to abort valve 48, step 218. If an ABORT COMMAND is issued, hydraulic fluid pressure is removed from motor 40, usually within 0.01 seconds. If a maximum rate has not been exceeded, control is transferred to step 202.

CPU board 60 also includes a software routine which permits the simulator to trim during tests and position changes without waiting for the stabilizer to move from one position to a new position by driving the hardware. With this "quick trim" feature, the software is updated to the new position and the indicator is then driven to the new position in approximately three seconds, one-tenth the former time interval.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. An apparatus for simulating horizontal stabilizer trim control in an aircraft, comprising:

a) pilot-actuated control means for moving simulated horizontal stabilizers, said pilot-actuated control means being movable through a range of travel by an applied force from a pilot;

b) counter force producing means connected to said pilot-actuated control means for producing a force simulating aerodynamic forces resisting movement of said simulated horizontal stabilizers;

c) torque sensing means operatively connected to said pilot-actuated control means and said counter force producing means for providing an output signal related to said force applied by said pilot to said pilot-actuated control means;

d) a transducer operatively connected to said pilot-actuated control means, said counter force producing means and said torque sensing means for producing an output signal related to a position within said range of travel of said pilot-actuated control means;

e) stabilizer position indicating means operatively connected to said pilot-actuated control means, said counter force producing means, and said torque sensing means for indicating a position of said simulated horizontal stabilizers, said stabilizer position indicating means generating a signal related to an indicated position; AND f) processing means operatively connected to said pilot-actuated control means, said counter force producing means, said stabilizer position indicating means, said transducer and said torque sensing means for receiving signals from said torque sensing means, said transducer and said stabilizer position indicating means, and, in response thereto, generating output signals for controlling simulated aerodynamic forces against said pilot-actuated control means, whereby a pilot can be trained to trim said horizontal stabilizers of an aircraft.

2. The apparatus in accordance with claim 1, wherein said processing means contains a program containing parameters for a particular aircraft, said parameters being reprogrammable to provide flight simulation control for another particular aircraft.

3. The apparatus of claim 2, wherein said program parameters include coulombic friction, cable stretch, inertia, position limits, manual and autopilot motor velocities, the control to surface gearing, aerodynamic forces, lost motion, clutch force and system malfunction information.

4. A method of flight simulation for control of horizontal stabilizer trim, comprising the steps of:

a) setting/inputting current flight maneuver parameters for an aircraft into a computer for processing flight simulation data and information;

b) computing the required force and rate for a simulated horizontal stabilizer trim control;

c) reading the current force, rate and position of said simulated horizontal stabilizer trim control;

d) updating position data;

e) determining whether the required force is equal to the current force read in step (c); and f) issuing a run command to stabilize said simulated horizontal stabilizer trim controls;

g) determining whether travel limits have been exceeded by said simulated horizontal stabilizer trim control; and if said travel limits have not been exceeded, issuing said run command in accordance with step (f); determining whether there is a runaway condition for said simulated hoirzontal stabilizer trim control; and if there is a runaway condition, issuing an abort command.

* * * * *